United States Patent Office 3,094,547

Patented June 18, 1963

3,094,547
PERFLUOROALKYLSULFONAMIDOALKYL ESTERS OF PHOSPHORUS ACIDS

Richard F. Heine, White Bear Lake, Minn., assignor to Minnesota Mining and Manufacturing Company, St. Paul, Minn., a corporation of Delaware
No Drawing. Filed Feb. 6, 1961, Ser. No. 87,060
9 Claims. (Cl. 260—461)

This invention relates to a new and useful class of phosphorus-containing fluorocarbon compounds and polymers thereof. The invention also relates to the sizing of fabrics to impart both repellency to water and resistance to absorption, and soiling by oily and greasy materials, to the coating and impregnation of matrices such as paper and leather, to the provision of certain desirable surfactant properties in polishes and plating baths, and for other purposes.

It is therefore an object of this invention to provide phosphorus-containing fluorocarbon compounds and derivatives thereof.

It is also an object of this invention to provide a method for preparing phosphorus-containing fluorocarbon compounds and derivatives thereof.

Still another object is to provide polymers of fluorocarbon phosphoryl chlorides.

An added object of this invention is to provide new materials for textile and leather treatment, release agents, surfactants, and for protective coatings on metal, wood, plastics and the like.

The novel phosphorus-containing fluorocarbon compounds of this invention have the formula

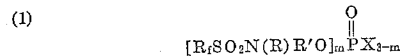

wherein R is hydrogen or an alkyl group having from 1 to about 12, preferably from 1 to 6, carbon atoms; R′ is an alkylene bridging group containing 2 to about 12 carbon atoms, preferably from 2 to 8 carbon atoms; $R_f$ is perfluoroaliphatic $C_nF_{2n+1}$ or perfluorocycloaliphatic $C_nF_{2n-1}$; $n$ is an integer from 1 to 18, preferably from 3 to 12; $m$ is integer from 1 to 3; and X is chlorine, hydroxyl, or a residual moiety of an active hydrogen-containing organic compound, preferably amino, alkoxy, or aralkoxy. R′ can be branched or straight chain. These compounds include, for example: N-ethyl perfluorooctanesulfonamidoethyl phosphoryl dichloridate, mono-(N-ethyl perfluorooctanesulfonamidoethyl) phosphate, mono-(N-hexylperfluorodecanesulfonamidoethyl) phosphate, bis-(N-propylperfluorocyclohexanesulfonamidoethyl) phosphate, mono-(perfluorohexanesulfonamidobutyl) phosphate, bis-(N-ethyl perfluoroethylcyclohexanesulfonamidoethyl) phosphate, di-phenyl (N-hexylperfluorocyclohexanesulfonamidoethyl) phosphate, N′-ethyl, N″-ethyl (N-ethyl perfluorooctanesulfonamidoethyl) phosphorodiamidate, etc. Active hydrogen atoms, as used herein, may be determined by the well-known Tschugaeff-Zerewitinoff analytical technique, e.g. note J.A.C.S. 49, 2181 (1927).

The compounds are prepared by carrying out the following reaction, usually at a temperature from about room temperature to about 110° C. and preferably above 50° C.:

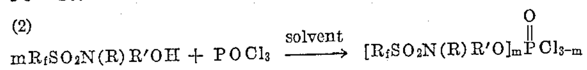

The reaction is preferably conducted in the presence of a solvent for the reactant alcohols, e.g. toluene, benzene, benzotrifluoride, etc. Fluorinated alcohols of the above type and their method of preparation are described in U.S. Patent No. 2,803,656. The value of $m$ can be varied from 1 to 3 by proper selection of the required equivalent amounts of the respective reactants. When $m$ is either 1 or 2, the chloride intermediate (also called the "chloridate") may be hydrolyzed to the acid derivative (also called the "phosphate") or may be reacted directly with an active hydrogen-containing compound, such as a phenol (e.g. phenol, etc.), an alcohol (e.g. ethyl alcohol, etc.), a primary or secondary amine, a mercaptan, or a hydroxide of an alkali or alkali earth metal, to produce the corresponding phosphate derivative.

The dichloridates or dichloride intermediates, i.e. $m=1$ in (2) above, are reactive monomers which may be copolymerized with other organic compounds having at least two active hydrogen atoms per molecule, e.g. dithiols, polyamines, glycols, including, for example, ethylene glycol, propylene glycol, butylene glycol, trimethylene glycol, tetramethylene glycol, hydroquinone, 2,2,3,3,4,4-hexafluoropentane diol, 3,3′-oxy-bis-tetrafluoropropanol, N-ethyl perfluorooctanesulfonamido propylene glycol, etc. These polymers are preferably prepared by heating the reactant admixture in a solvent therefor and in the presence of an acid acceptor, e.g. pyridine, preferably at slightly elevated temperatures, e.g. up to about 100° C. These polymers contain the recurring group:

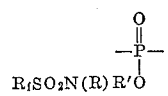

and are best prepared by reacting approximately equivalent amounts of the dichloridate with the active hydrogen-containing compound, preferably with an excess of the latter. Mixtures of different dichloridates and different active hydrogen-containing compounds may be used to vary the properties of the resulting polymers, which can be employed in leather and textile treatment, as paper impregnants, solvent-resistant sealants, protective coatings for metals and other surfaces subject to corrosion and weathering, etc.

The monochloridate and dichloridate intermediates may also be reacted with other active hydrogen-containing compounds such as water or an alcohol to form the corresponding acids and esters, as indicated earlier, in which form they have a wide range of useful applications including those of plating bath additives, low foaming surfactants, water and oil-repellency treating materials for textiles, paper and leather, anti-wear and anti-corrosion additives for oils and lubricants, additives for polishes and waxes, protective and flame-resistant coatings for metals and other substrates, etc. The intermediates can also be converted to the inorganic salts by reaction with inorganic bases, particularly the alkali and alkali earth metal bases, e.g. sodium hydroxide, etc., which salts are alse useful surfactants in aqueous media, in polishes and waxes, etc.

When $m$ is 3 in the above formula, the phosphates have the structure

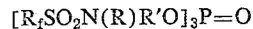

in which form the phosphate may be used as a textile-treating material to impart both oil and water resistance to various textile fabrics.

The following examples will illustrate the preparation of these novel phosphorus-containing compounds and derivatives thereof.

*Example 1*

57.1 grams (0.1 mol) of N-ethyl perfluorooctanesulfonamidoethyl alcohol was mixed with 100 ml. of benzene, and 15.3 grams (0.1 mol) of phosphorus oxytrichloride was added with stirring. After refluxing the mixture until no further HCl was evolved, the benzene was removed under vacuum and the residue distilled into two fractions, B.P. 120–150° C. (0.1 mm.) and 150–152° C. (0.1 mm.).

Analysis of the second cut was: Found: Percent Cl=

8.2%, percent P=2.81%, percent C=22.8%. Calculated for N-ethyl perfluorooctanesulfonamidoethyl phosphoryl dichloridate: Percent Cl=10.3%, percent P=3.6%, percent C=20.9%. The dichloride was shaken with water to produce the corresponding acid by hydrolysis, and the only slightly soluble acid product was separated and dried. Analysis of this acid confirmed the formula:

$$C_8F_{17}SO_2N(C_2H_5)CH_2CH_2OPO(OH)_2$$

| | Actual, percent | Calculated, percent |
|---|---|---|
| Percent C | 22.7 | 22.1 |
| Percent N | 2.19 | 2.15 |
| Percent P | 4.12 | 4.74 |

The disodium salt of this acid was formed by mixing equivalent amounts of the acid and aqueous sodium hydroxide and had good surfactant properties.

A solution of 0.01% of this disodium salt in water lowered the surface tension at 25° C. to 25 dynes/cm. Addition of the acid itself to water (0.05% by weight) reduced the surface tension to 18 dynes/cm. at 25° C.

*Example 2*

The preparation of Example 1 was followed using toluene as solvent rather than benzene. Instead of first removing solvent under vacuum and then hydrolyzing the chloride product, about twice the amount of water necessary to hydrolyze the dichloride was added directly to the toluene solution. The relatively insoluble acid precipitated, permitting either filtration of the mixture or simple decantation to remove solvent before air or oven-drying of the product.

*Example 3*

To illustrate the preparation of esters, 100 ml. of a benzene solution of N-ethyl perfluorooctanesulfonamidoethyl phosphoryl dichloride (43 weight percent) was admixed with 13 grams of phenol and 10 grams of pyridine. After stirring and refluxing for four hours, the top layer was separated and benzene removed under vacuum to produce the low-melting solid di-phenyl-(N-ethyl perfluorooctanesulfonamidoethyl) phosphate which, when recrystallized as white crystals from 95% ethanol and 5% isopropanol, has a melting point of about 48–50° C.

*Example 4*

Two hundred grams of N-ethyl perfluorooctanesulfonamidoethyl alcohol was admixed with 100 ml. benzene and 150 ml. of benzotrifluoride. Forty grams of pyridine was then added, after which 16.7 grams of phosphorus oxytrichloride was added with stirring. The mixture was refluxed for 16 hours, cooled and filtered. The residue was slurried with water, filtered and dried under vacuum at 60° C. The product, M.P. of about 92° C., was tris-(N-ethyl perfluorosulfonamidoethyl) phosphate which, when evaporated from an acetone solution, produces a clear brittle film. This product can be used to impart both water and oil repellency to various textile fabrics. The AATCC Spray Test 22–1952 was used to measure water repellency. Since there is no standard test for the measurement of oil repellency of fabrics, the following empirical test, which has been found to yield significant and reproducible results, was employed.

The oil repellency test is based on the different penetrating properties of two hydrocarbon liquids, i.e. mineral oil ("Nujol") and n-heptane. Mixtures of these two liquids are miscible in all proportions and show penetrating properties proportioned to the n-heptane content of the mixture. The oil repellency numbers were selected to correspond to the AATCC Standard Spray Ratings (AATCC 22–1952), which measure water repellency. The technique for measuring oil repellency is as follows:

Swatches (8-inch by 8-inch) of the treated fabric are placed on a flat table. Test mixtures of various concentrations of n-heptane and mineral oil are contained in small dropping bottles. A drop of each mixture is gently placed, not dropped, onto the fabric surface, preferably in two different portions of the test swatch. After the drops have been allowed to stand undisturbed for three minutes, the fabric appearance is observed through the oil drop. Penetration or wetting, as evidenced by darkening, is noted. The number of the mixture containing the highest proportion of n-heptane, which does not penetrate or wet the fabric after three minutes' contact, is called the oil repellency of the specimen. The division between failure or resistance of successive test mixtures is generally quite sharp, presenting little problem in determining the break point. The following test mixtures are employed, the higher rating being the more oil repellent.

| Oil Repellency Rating | Volume Percent Heptane | Volume Percent Mineral Oil |
|---|---|---|
| 100+ | 60 | 40. |
| 100 | 50 | 50. |
| 90 | 40 | 60. |
| 80 | 30 | 70. |
| 70 | 20 | 80. |
| 50 | 0 | 100. |
| 0 | | no holdout to mineral oil. |

A 1% solution of this phosphate in acetone-methyl chloroform (10:90 weight percent) was applied to various fabrics by the well-known padding technique, with the following results:

| | Oil | Spray |
|---|---|---|
| Cotton swatch (80 x 80), air dried | 100+ | 70 |
| Cotton swatch dried 10 min. @ 150° C | 100+ | 50 |
| Wool swatch dried 10 min. @ 150° C | 100+ | 80 |

*Example 5*

Two equivalents of N-ethyl perfluorooctanesulfonamidoethyl alcohol were admixed in 100 ml. of benzene, and one equivalent of phosphorus oxytrichloride was added with stirring. After refluxing the mixture until no further HCl was evolved, the benzene was removed under vacuum and the monochloridate intermediate was recovered by vacuum distillation. Analysis was: C—24.4%, F—53.4%; calculated for the monochloridate: C—26.5%, F—52.8%. This monochloridate was shaken with water to produce the corresponding acid by hydrolysis, and the acid product $$[C_8F_{17}SO_2N(C_2H_5)CH_2CH_2O]_2\overset{O}{\overset{\|}{P}}OH$$

was then separated and dried. This acid may be used as a surfactant.

*Example 6*

The following tests were performed to indicate the efficiency of the compounds of this invention as anti-wear additives in lubricants.

Using a Shell Four Ball Tester and running for thirty minutes at an applied load of 11 kg., the following results were obtained, using SAE–10–W motor oil as base oil:

| | Average wear scar diameter, mm. |
|---|---|
| Base oil | 0.49 |
| Base oil+2% PFP [1] | 0.25 |
| Base oil+0.2% PFP [1] | 0.35 |

[1] Di-phenyl-(N-ethyl perfluorosulfonamidoethyl) phosphate.

The results indicate that PFP is an excellent anti-wear additive for lubricants and is superior to tricresyl phosphate at equivalent concentrations.

*Example 7*

The presence of 0.01% of the disodium salt of N-ethyl perfluorooctanesulfonamidoethyl phosphate in 0.125 M sodium hydroxide reduced the rate of attack of the solution at room temperature on aluminum by 75% as determined by weight loss measurements. It also resulted in a much brighter finish on the aluminum and prevented the formation of grey smut on the aluminum surface. These comparative runs were made with an uninhibited solution of 0.125 M sodium hydroxide.

*Example 8*

About 0.1 weight percent of $$C_8F_{17}SO_2N(C_2H_5)CH_2CH_2OPO(OH)_2$$

was added to polychlorotrifluoroethylene oil (available commercially as "Kel-F" brand #10 oil) with stirring. A degreased steel ball was then coated with the oil by immersion and placed in a test tube of distilled water. No detectable rusting of the steel ball was observed for several days. When a similar steel ball is immersed in the same polychlorotrifluoroethylene oil without the phosphate additive and subjected to the same distilled water exposure, rusting is observed within one hour.

*Example 9*

0.2 mol of hydroquinone was stirred into 20 grams of pyridine and 100 ml. of benzene and heated until dissolved. Then 0.1 mol of N-ethyl perfluorooctanesulfonamidoethyl phosphoryl dichloridate was added slowly into this solution. The admixture was stirred for three hours with stirring. After cooling, the benzene top phase was decanted and the yellowish bottom phase was dissolved in acetone, filtered and placed under vacuum to remove the solvent. The sticky product was further dried in a vacuum oven at 60° C. to produce a relatively hard polymeric material having some elastomeric properties.

*Example 10*

The adhesion of ordinary masking tape to treated and untreated panels is approximately the same. However, upon aging in sunlight, the ultraviolet light causes the tape adhesive to harden and make the tape difficult to remove. Ordinary removal of the masking tape leaves portions of the hardened adhesive on the stainless steel panel, which may be cleared with difficulty by solvents, such as benzene, etc.

A bare stainless steel panel is treated with a 0.1 weight percent solution of N-ethyl perfluorooctanesulfonamidoethyl phosphate $$C_8F_{17}SO_2N(C_2H_5)CH_2CH_2OPO(OH)_2$$

and permitted to air dry.

Masking tape is then applied to the panels. After extensive aging and exposure to ultraviolet light, the masking tape on the treated panels was readily removed, leaving no residual adhesive on the panel surface. The aged tape on the untreated panels is removed only partially, as mentioned earlier. This clearly indicates the valuable release properties of the phosphates of this invention.

Aluminum panels treated with a 5 weight percent solution of the above phosphate in isopropanol had the shear force for ice adhesion reduced from 198 to 40 p.s.i. Such release properties can be utilized, for example, in the treatment of aluminum ice-cube trays.

I claim:

1. A fluorinated compound having the formula $$[R_fSO_2N(R)R'O]_m\overset{O}{\overset{\|}{P}}X_{3-m}$$

wherein $R_f$ is a perfluorinated radical selected from the group consisting of aliphatic $C_nF_{2n+1}$ and cyclo-aliphatic $C_nF_{2n-1}$, $n$ is an integer from 1 to 18, R is selected from the group consisting of hydrogen and an alkyl radical having from 1 to 12 carbon atoms, R' is an alkylene bridging radical having from 2 to 12 carbon atoms, $m$ is an integer from 1 to 2, and X is selected from the group consisting of chlorine and hydroxyl.

2. A fluorinated compound of the formula $$[R_fSO_2N(R)R'O]_m\overset{O}{\overset{\|}{P}}Cl_{3-m}$$

wherein $R_f$ is a perfluorinated radical selected from the group consisting of aliphatic $C_nF_{2n+1}$ and cyclo-aliphatic $C_nF_{2n-1}$, $n$ is an integer from 1 to 18, R is selected from the group consisting of hydrogen and an alkyl radical having from 1 to 12 carbon atoms, R' is an alkylene bridging radical having from 2 to 12 carbon atoms and $m$ is an integer from 1 to 2.

3. A fluorinated compound of the formula $$[R_fSO_2N(R)R'O]_m\overset{O}{\overset{\|}{P}}(OH)_{3-m}$$

wherein $R_f$ is a perfluorinated radical selected from the group consisting of aliphatic $C_nF_{2n+1}$ and cyclo-aliphatic $C_nF_{2n-1}$, $n$ is an integer from 1 to 18, R is selected from the group consisting of hydrogen and an alkyl radical having from 1 to 12 carbon atoms, R' is an alkylene bridging radical having from 2 to 12 carbon atoms and $m$ is an integer from 1 to 2; and the inorganic salts thereof.

4. A fluorinated compound of the formula $$C_8F_{17}SO_2N(C_2H_5)CH_2CH_2OPOCl_2$$

5. A fluorinated compound of the formula $$C_8F_{17}SO_2N(C_2H_5)CH_2CH_2OPO(OH)_2$$

6. A fluorinated compound of the formula $$[C_8F_{17}SO_2N(C_2H_5)CH_2CH_2O]_2\overset{O}{\overset{\|}{P}}Cl$$

7. A fluorinated compound of the formula $$[C_8F_{17}SO_2N(C_2H_5)CH_2CH_2O]_2\overset{O}{\overset{\|}{P}}OH$$

8. A polymer having the recurring group $$\begin{matrix} O \\ \| \\ -P- \\ | \\ R_fSO_2N(R)R'O \end{matrix}$$

wherein $R_f$ is a perfluorinated radical selected from the group consisting of aliphatic $C_nF_{2n+1}$ and cyclo-aliphatic $C_nF_{2n-1}$, $n$ is an integer from 1 to 18, R is selected from the group consisting of hydrogen and an alkyl radical having from 1 to 12 carbon atoms, and R' is an alkylene bridging radical having from 2 to 12 carbon atoms.

9. A polymer of an organic compound having at least two active hydrogen atoms per molecule, and $$[R_fSO_2N(R)R'O]\overset{O}{\overset{\|}{P}}Cl_2$$

wherein $R_f$ is a perfluorinated radical selected from the group consisting of aliphatic $C_nF_{2n+1}$ and cyclo-aliphatic $C_nF_{2n-1}$, $n$ is an integer from 1 to 18, R is selected from the group consisting of hydrogen and an alkyl radical having from 1 to 12 carbon atoms, and R' is an alkylene bridging radical having from 2 to 12 carbon atoms.

References Cited in the file of this patent

UNITED STATES PATENTS 2,803,656 Albrecht ---------------- Aug. 20, 1957